US010954700B2

(12) United States Patent
Tamura et al.

(10) Patent No.: US 10,954,700 B2
(45) Date of Patent: Mar. 23, 2021

(54) OPENING CONTROL DEVICE (71) Applicant: MITSUI KINZOKU ACT CORPORATION, Yokohama (JP)

(72) Inventors: Shunsuke Tamura, Yokohama (JP); Shintaro Okawa, Yokohama (JP); Toshio Takenaka, Yokohama (JP)

(73) Assignee: MITSUI KINZOKU ACT CORPORATION, Yokohama (JP)

( * ) Notice: Subject to any disclaimer, the term of this patent is extended or adjusted under 35 U.S.C. 154(b) by 859 days.

(21) Appl. No.: 15/535,676

(22) PCT Filed: Dec. 15, 2014

(86) PCT No.: PCT/JP2014/083140
§ 371 (c)(1),
(2) Date: Jun. 13, 2017

(87) PCT Pub. No.: WO2016/098158
PCT Pub. Date: Jun. 23, 2016

(65) Prior Publication Data
US 2017/0342751 A1 Nov. 30, 2017

(51) Int. Cl.
E05B 83/38 (2014.01)
B60J 5/04 (2006.01)

(52) U.S. Cl.
CPC ............. *E05B 83/38* (2013.01); *B60J 5/0479* (2013.01); *B60J 2005/0475* (2013.01)

(58) Field of Classification Search
CPC ............... Y10T 292/57; Y10T 292/081; Y10T 292/0848; Y10T 292/0851;
(Continued)

(56) References Cited

U.S. PATENT DOCUMENTS 1,547,775 A * 7/1925 Armstrong .............. E05F 11/00
292/5
2,030,630 A * 2/1936 Gram ........................ E05C 3/24
292/210
(Continued)

FOREIGN PATENT DOCUMENTS

CN 1711180 A 12/2005
CN 203050275 U 7/2013
(Continued)

OTHER PUBLICATIONS

Computer Generated Translation for JP 2014-95241, Generated on Feb. 27, 2020, https://worldwide.espacenet.com/ (Year: 2020).*
(Continued)

*Primary Examiner* — Alyson M Merlino
(74) *Attorney, Agent, or Firm* — Foley & Lardner LLP (57) ABSTRACT

In an opening control device that controls the opening of an access panel door, a movable member of a detecting portion, which is pushed in by a main door that is in a closed state, is brought into direct abutment with a connection lever to move the connection lever, wherein the connection lever connects a drive lever, which is linked to operate with an opening operation of the door, and a driven lever, which releases the locking by locking portions, wherein the connection lever has a displacement area which includes a connecting position and in which maintains the connection of the drive lever with the driven lever, the connection lever is moved toward a disconnecting position within the displacement area when the movable member staying in a protruding position and is moved to the disconnecting position as the movable member is pushed into the pushed-in position.

6 Claims, 10 Drawing Sheets

(58) Field of Classification Search
CPC ......... Y10T 292/0853; Y10T 292/0854; Y10T 292/0855; Y10T 292/0857; Y10T 292/0859; Y10T 292/1047; Y10T 292/1048; Y10T 292/1053; Y10T 292/1054; Y10T 292/1055; Y10T 292/1056; Y10T 292/1057; Y10T 292/1059; Y10T 292/106; Y10T 292/1078; Y10T 292/108; Y10T 292/1076; Y10T 292/1077; Y10T 292/08; Y10S 292/23; E05B 83/38; B60J 5/0479; B60J 2005/0475
See application file for complete search history.

(56) References Cited

U.S. PATENT DOCUMENTS

| | | | | | |
|---|---|---|---|---|---|
| 2,169,535 | A | * | 8/1939 | Marple | E05B 85/22 292/165 |
| 5,718,465 | A | * | 2/1998 | Dowling | E05B 83/40 292/216 |
| 5,803,516 | A | * | 9/1998 | Hempel | E05B 83/38 292/223 |
| 6,752,440 | B2 | * | 6/2004 | Spurr | E05B 83/38 292/336.3 |
| 6,848,737 | B2 | * | 2/2005 | Mikolai | B60J 5/0479 292/336.3 |
| 7,182,392 | B2 | | 2/2007 | Sawajiri | |
| 7,309,100 | B2 | * | 12/2007 | Sawajiri | E05B 83/38 292/336.3 |
| 7,950,704 | B2 | * | 5/2011 | Kovie | E05B 83/38 292/336.3 |
| 9,140,038 | B2 | * | 9/2015 | Naka | E05B 83/38 |
| 2006/0145512 | A1 | | 7/2006 | Gabsch et al. | |

FOREIGN PATENT DOCUMENTS

| | | |
|---|---|---|
| JP | 2005-16149 A | 1/2005 |
| JP | 2007-100318 A | 4/2007 |
| JP | 4204996 B2 | 1/2009 |
| JP | 5809431 B2 | 11/2012 |
| JP | 2014-95241 A | 5/2014 |

OTHER PUBLICATIONS

International Search Report in PCT/JP2014/083140, dated Mar. 3, 2015, 3 pages.
Chinese Office Action dated Sep. 5, 2018 in corresponding application No. 201480084034.1.

* cited by examiner

OPENING CONTROL DEVICE

CROSS REFERENCE TO RELATED APPLICATIONS

This is a U.S. national stage application claiming the benefit of International Patent Application No. PCT/JP2014/083140 filed Dec. 15, 2014, the entire content of which is incorporated herein by reference.

TECHNICAL FIELD

The present invention relates to an opening control device for an opening-and-closing member.

BACKGROUND ART

In a vehicle such as a motor vehicle, for example, double doors are sometimes adopted as a side door, for example. In the side door adopting the double doors, when a main door (a door for a front seat) is closed, an access panel door (a door for a rear seat) is fastened engagingly in a door frame and is locked in a closed state. The access panel door can be opened only when the main door is open, and the main door is configured to be opened in advance of the access panel door (for example, refer to PTLs 1, 2).

An access panel door described in PTL 1 includes a latch device which locks the access panel door in a closed state and a connecting unit which transmits an operation performed on an opening handle for opening the access panel door to the latch device to release the locking of the access panel door by the latch device.

The connecting unit has an opening lever which is connected to the opening handle, a release lever which is connected to the latch device, an operation lever which is placed at an abutment portion of the access panel door with the main door to be operated in association with the opening and closing of the main door, and a lock lever which is connected to the operation lever via a connecting member such as a rod or a cable.

The lock lever which is connected to the operation lever via the connecting member is linked with the operation lever which is operated in association with the opening and closing of the main door so as to connect the opening lever and the release lever together in the event of the main door being kept open and to release the connection of the opening lever with the release lever in the event of the main door being kept closed.

In the event of the main door being kept closed, the operation performed on the opening handle is not transmitted to the latch device, whereby the locking of the access panel door by the latch device is maintained. Only in the event of the main door being kept open, the operation performed on the opening handle is transmitted to the latch device, whereby the locking of the access panel door by the latch device is released, allowing the access panel door to be opened.

An access panel door described in PTL 2 also includes a latch device which locks the access panel door in a closed state and a latch switching device which transmits an operation performed on an opening handle for opening the access panel door to the latch device to release the locking of the access panel door by the latch device.

The latch switching device has a base lever which is connected to the opening handle, a latch lever which is connected to the latch device, a detection lever which is placed at an abutment portion of the access panel door with a main door to be operated in association with the opening and closing of the main door and a middle member with which the detection lever is brought into direct abutment.

The middle member with which the detection lever is brought into direct abutment is interlocked with the detection lever which is operated in association with the opening and closing of the main door and is configured so as to connect the base lever with the latch lever in the event of the main door being kept open and to release the connection of the base lever with the latch lever in the event of the main door being kept closed.

In the event of the main door being kept closed, the operation performed on the opening handle is not transmitted to the latch device, whereby the locking of the access panel door by the latch device is maintained. Only in the event of the main door being kept open, the operation performed on the opening handle is transmitted to the latch device, whereby the locking of the access panel door by the latch device is released, allowing the access panel door to be opened.

CITATION LIST

Patent Literature

PTL 1: Japanese Patent Publication No. 4204996
PTL 2: JP-A-2014-95241

SUMMARY OF INVENTION

Technical Problem

In the access panel door described in PTL 1, the lock lever which connects the opening lever with the release lever in response to the opening of the main door and the operation lever which is operated in association with the opening and closing of the main door are connected via the connection member. In this case, in order to execute a switch between connecting the opening lever with the release lever and releasing the connection of the opening lever with the release lever in an ensured fashion, it is required not only to set a tolerance for the length of the connection member but also to control the lengthwise dimension of the connection member strictly to the tolerance so set.

In the access door panel described in PTL 2, the middle member which connects the base lever with the latch lever in response to the opening of the main door and the detection lever which is operated in association with the opening and closing of the main door are in direct abutment with each other without involvement of the connection member. This obviates the necessity of considering not only the reduction in the number of constituent components but also the tolerance for the length of the connection member, whereby the reduction in production cost is realized.

However, there are fears that a gap is produced between respective abutment portions of the middle member and the detection lever due to a dimension error of a structural member which makes up the access panel door where the middle member and the detection lever are placed. In the access door panel described in PTL 2, the detection lever which is operated in association with the closing of the main door is biased by the middle member so as to be restored to its original state in association with the opening of the main door. However, in case a gap is produced between the respective abutment portions of the middle member and the detection lever, the detection lever is caused to move independently of the middle member.

Then, if the detection lever being configured to move independently of the middle member, the detection lever is not restored to its original state completely, and the operation of the detection lever associated with the closing of the main door becomes uncertain, resulting in fears that a problem is caused in executing a switch between connecting the base lever with the latch lever and releasing the connection of the base lever with the latch lever. In addition, there are fears that a striking sound is produced as a result of the detection lever which is operated in association with the closing of the main door colliding with the middle member.

The invention has been made in view of the situations described above, and an object thereof is to provide an opening control device which can not only reduce production costs but also enhance the reliability in operation.

Solution to Problem

An opening control device according to one aspect of the present invention is an opening control device, which is provided on an auxiliary opening-and-closing member that is opened in such a way as to follow an opening of a main opening-and-closing member, and which is configured to control the opening of the auxiliary opening-and-closing member, the opening control device comprising: a locking portion configured to switch between a locking state where the auxiliary opening-and-closing member is locked in a closed state relative to a frame member and an unlocking state; a detecting portion, which is placed at an abutment portion of the auxiliary opening-and-closing member with the main opening-and-closing member, and which has a movable member that is moveable between a protruding position and a pushed-in position, the movable member being pushed into the pushed-in position from the protruding position by the main opening-and-closing member that is in the closed state; a drive portion that is linked with an opening operation of the auxiliary opening-and-closing member; a driven portion, which is operated by the drive portion, and which is configured to shift the locking portion from the locking state to the unlocking state; a connecting portion that is moveable between a connecting position where the drive portion and the driven portion are connected together so that an operation of the drive portion is transmitted to the driven portion and a disconnecting position; and a first biasing member that biases the connecting portion from the disconnecting position toward the connecting position, wherein the movable member is brought into direct abutment with the connecting portion to move the connecting portion, and wherein the connecting portion has a displacement area which includes the connecting position and in which the connecting portion maintains the connection of the drive portion with the driven portion, the connecting portion being moved toward the disconnecting position within the displacement area when the movable member staying in the protruding position and being moved to the disconnecting position as the movable member is pushed into the pushed-in position.

Advantageous Effects of Invention

According to the invention, it is possible to provide the opening control device which can not only reduce production costs but also enhance the reliability in operation.

DESCRIPTION OF EMBODIMENTS

Figure 1:
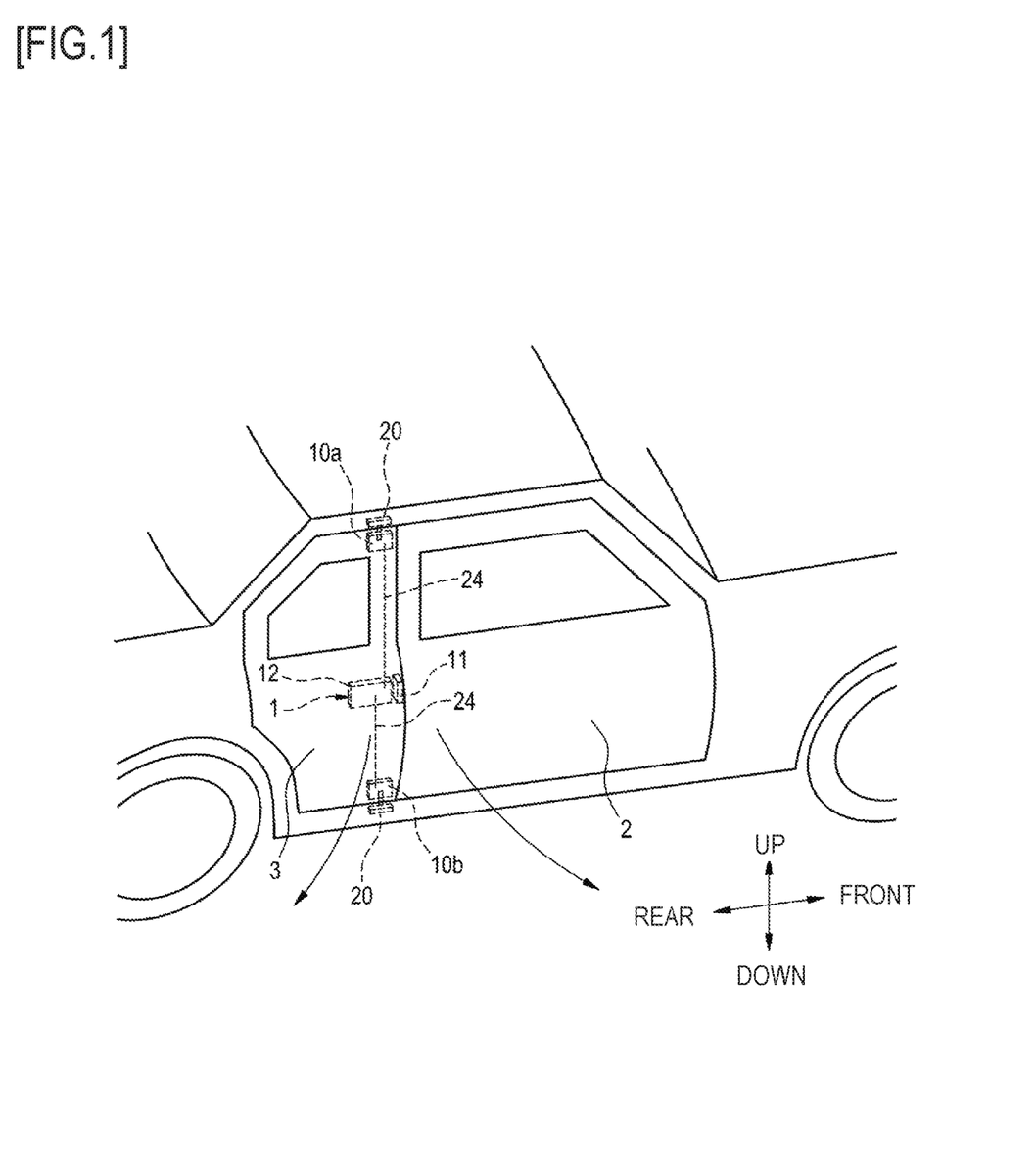
FIG. 1 A diagram showing the configuration of an example of an opening control device to describe an embodiment of the invention.

FIG. 1 shows the configuration of an example of an opening control device to describe an embodiment of the invention.

An opening control device 1 controls the opening of an access panel door (a door for a rear seat) 3 of a side door of a vehicle. The side door of the vehicle of this embodiment is made up of a main door (a door for a front seat) 2 and the access panel door 3. A hinge is provided at a front edge portion of the main door 2 which faces the front of the vehicle, and a hinge is provided at an edge portion of the access panel door 3 which faces the rear of the vehicle. Thus, the main door 2 and the access panel door 3 make up double doors.

The opening control device 1 is placed on the access panel door 3 and is configured so that when the main door 2 is closed, the access panel door 3 is fastened engagingly in a door frame and is locked in a closed state and that the access panel door 3 can be opened only when the main door 2 is open, allowing the main door 2 to be opened in advance of the access panel door 3.

The opening control device 1 includes locking portions 10*a*, 10*b* which can switch the state of the access panel door 3 between a locked state where the access panel door 3 is locked in a door frame in a closed state and an unlocked state where the access panel door 3 can be opened, a detecting portion 11 which detects whether the main door 2 is opened or closed and a relay portion 12 which transmits an operation performed on an opening handle for opening the access panel door 3 to the locking portions 10*a*, 10*b* to release the locking of the access panel door 3 by the locking portions 10*a*, 10*b*.

In the illustrated embodiment, one locking portion 10*a* is provided at an upper edge portion of the access panel door 3 which faces an upper side of the vehicle, and the other locking portion 10*b* is provided at an edge portion of the access panel door 3 which faces a lower side of the vehicle. Thus, the access panel door 3 is locked in the door frame at the two upper and lower locations.

Figure 2:
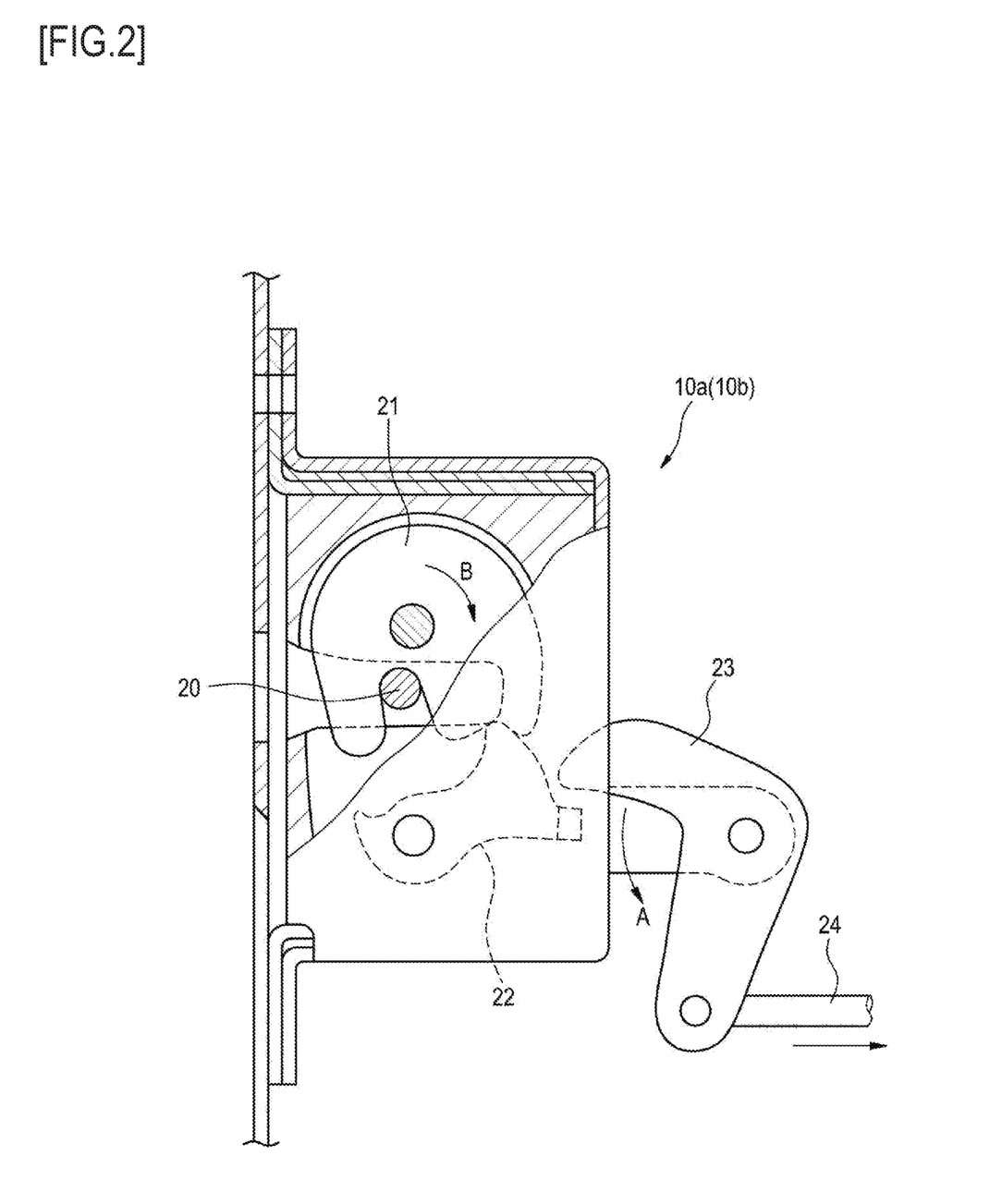
FIG. 2 A diagram showing the configuration of a lock portion of the opening control device shown in FIG. 1.

FIG. 2 shows the configuration of the locking portions 10*a*, 10*b*.

The locking portions 10*a*, 10*b* each have a latch 21 which locks a striker 20 which is provided on the door frame, a ratchet 22 which is brought into engagement with the latch 21 to maintain the locking of the striker 20 by the latch 21 and a ratchet lever 23 which is brought into engagement with the ratchet 22. The ratchet lever 23 is connected to the relay portion 12 by way of a connection member 24 such as a rod or a cable.

As the opening handle is operated to open the access panel door 3, the connection member 24 is pulled by the relay portion 12, whereby the ratchet lever 23 is rotated in a direction indicated by an arrow A. The ratchet 22 is dislocated from the latch 21 in association with the rotation of the ratchet lever 23, and the latch 21 is permitted to rotate in a direction indicated by an arrow B, whereby the locking of the striker 20 by the latch 21 is released. This enables the access panel door 3 to be opened.

Figure 3:
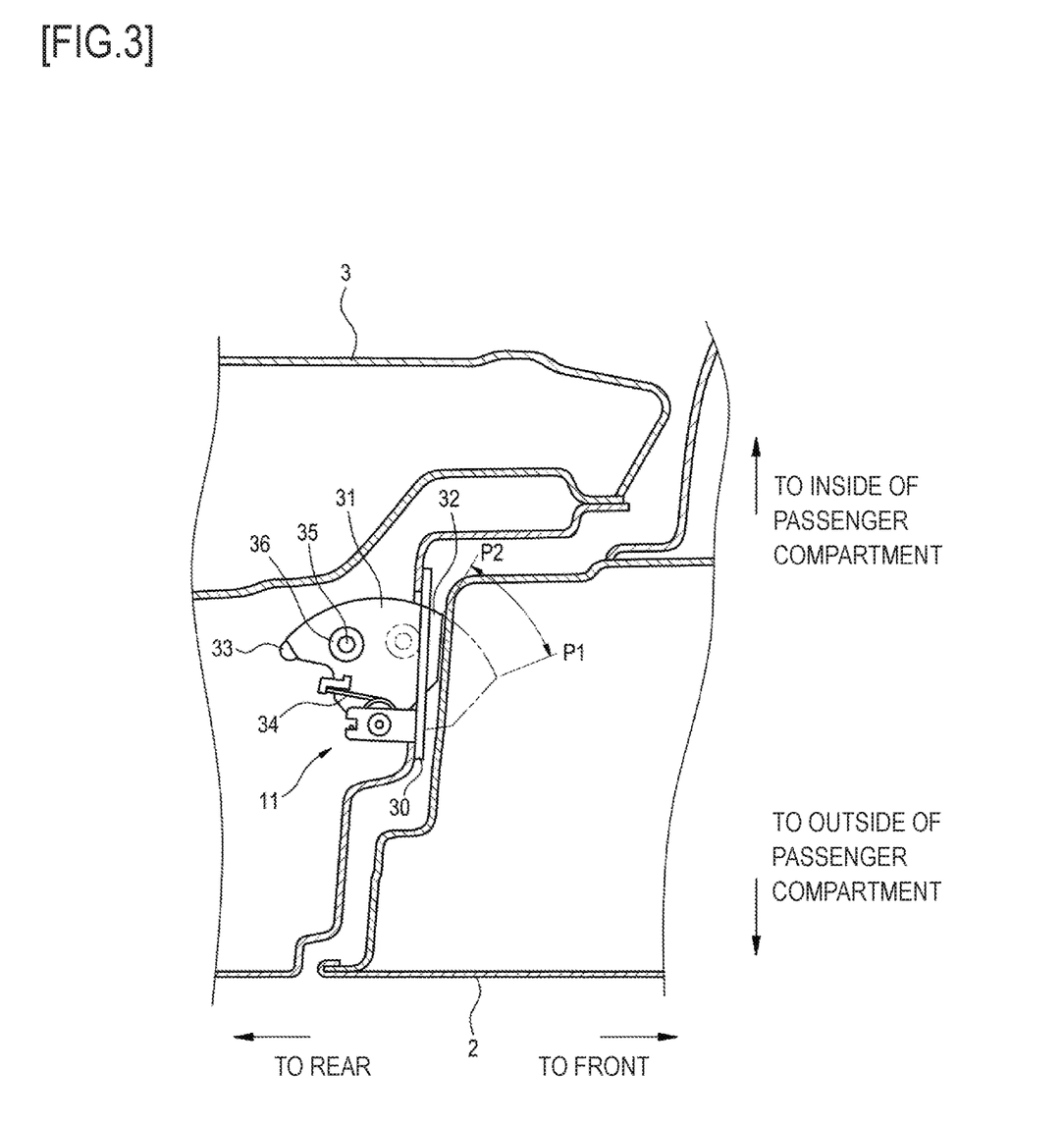
FIG. 3 A diagram showing the configuration of a detecting portion of the opening control device shown in FIG. 1.

FIG. 3 shows the configuration of the detecting portion 11.

The detecting portion 11 is placed at an abutment portion with the main door 2 on an edge portion of the access panel door 3 which faces the front of the vehicle.

The detecting portion 11 has a base plate 30 which is fixed to a structural member of the access panel door 3 and a movable member 31 which is supported on the base plate 30 so as to be swingable. A pressed portion 32 and an acting portion 33 are provided on the movable member 31. The pressed portion 32 protrudes out of the access panel door 3 to be pressed against an abutment portion with the access panel door 3 on an edge portion of the main door 2 which faces the rear of the vehicle. The acting portion 33 is accommodated in an interior of the access panel door 3 and acts on the relay portion 12.

The movable member 31 is supported on the base plate 30 so as to be swingable between a protruding position P1 where the pressed portion 32 protrudes out of the access panel door 3 and a pushed-in position P2 where the pressed portion 32 is pushed in toward the interior of the access panel door 3. The movable member 31 is biased from the pushed-in position P2 toward the protruding position P1 by a spring (a second biasing member) 34. A stopper 35 is provided on the movable member 31. This stopper 35 is brought into abutment with the base plate 30 to retain the movable member 31 which is biased by the spring 34 in the protruding position P1. An outer circumference of the stopper 35 is covered with a buffer material 36, and this buffer material 36 mitigates a striking sound produced when the stopper 35 is brought into abutment with the base plate 30.

When the main door 2 is closed, the pressed portion 32 which protrudes out of the access panel door 3 is pressed by the main door 2, whereby the movable member 31 moves from the protruding position P1 to the pushed-in position P2, whereas when the main door 2 is opened, the movable member 31 returns from the pushed-in position P2 to the protruding position P1. The movement of the movable member 31 from the protruding position P1 to the pushed-in position P2 and from the pushed-in position P2 to the protruding position P1 is transmitted to the relay portion 12 by way of the acting portion 33.

Figure 4:
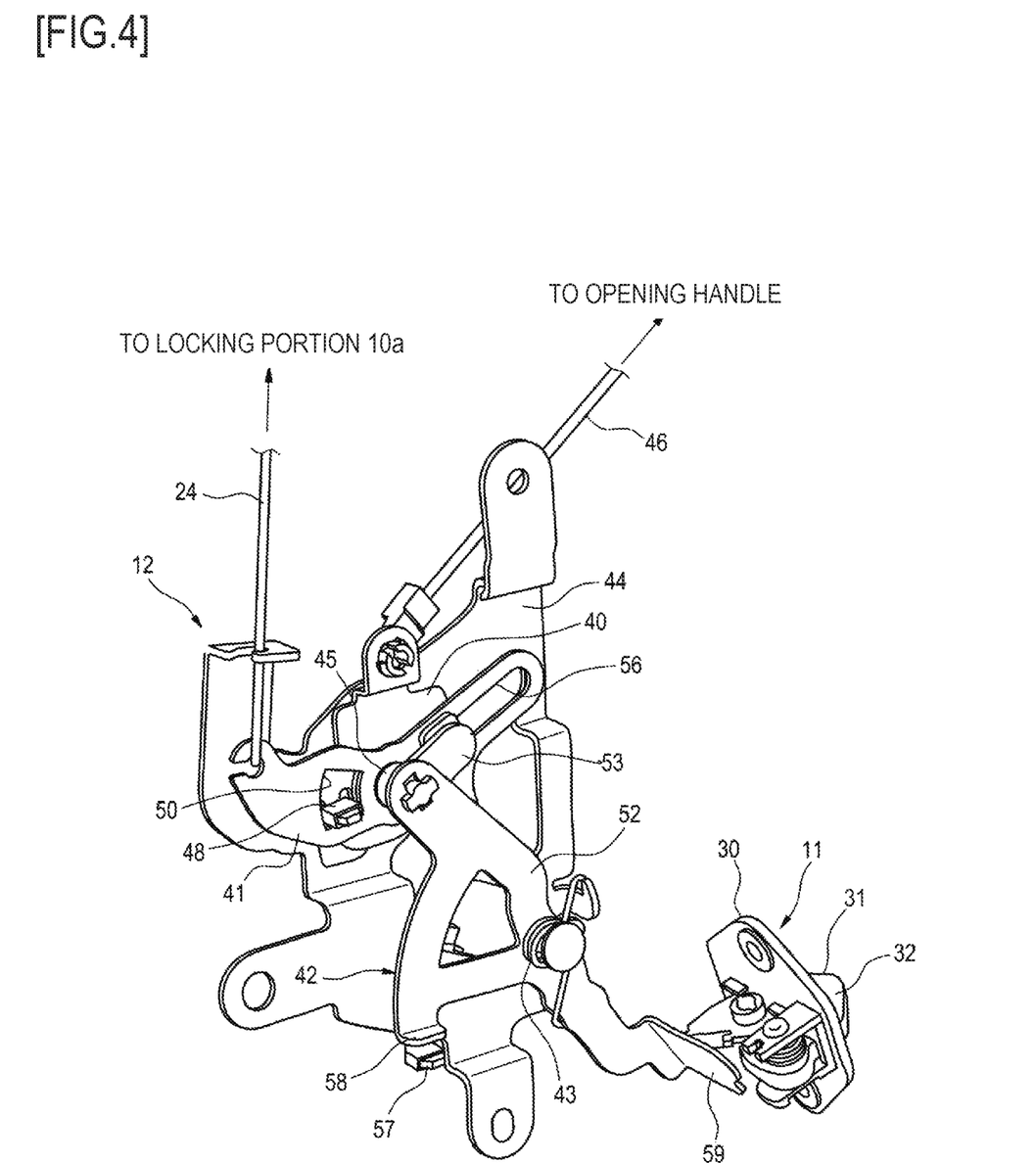
FIG. 4 A diagram showing the configuration of a relay portion of the opening control device shown in FIG. 1.
Figure 5:
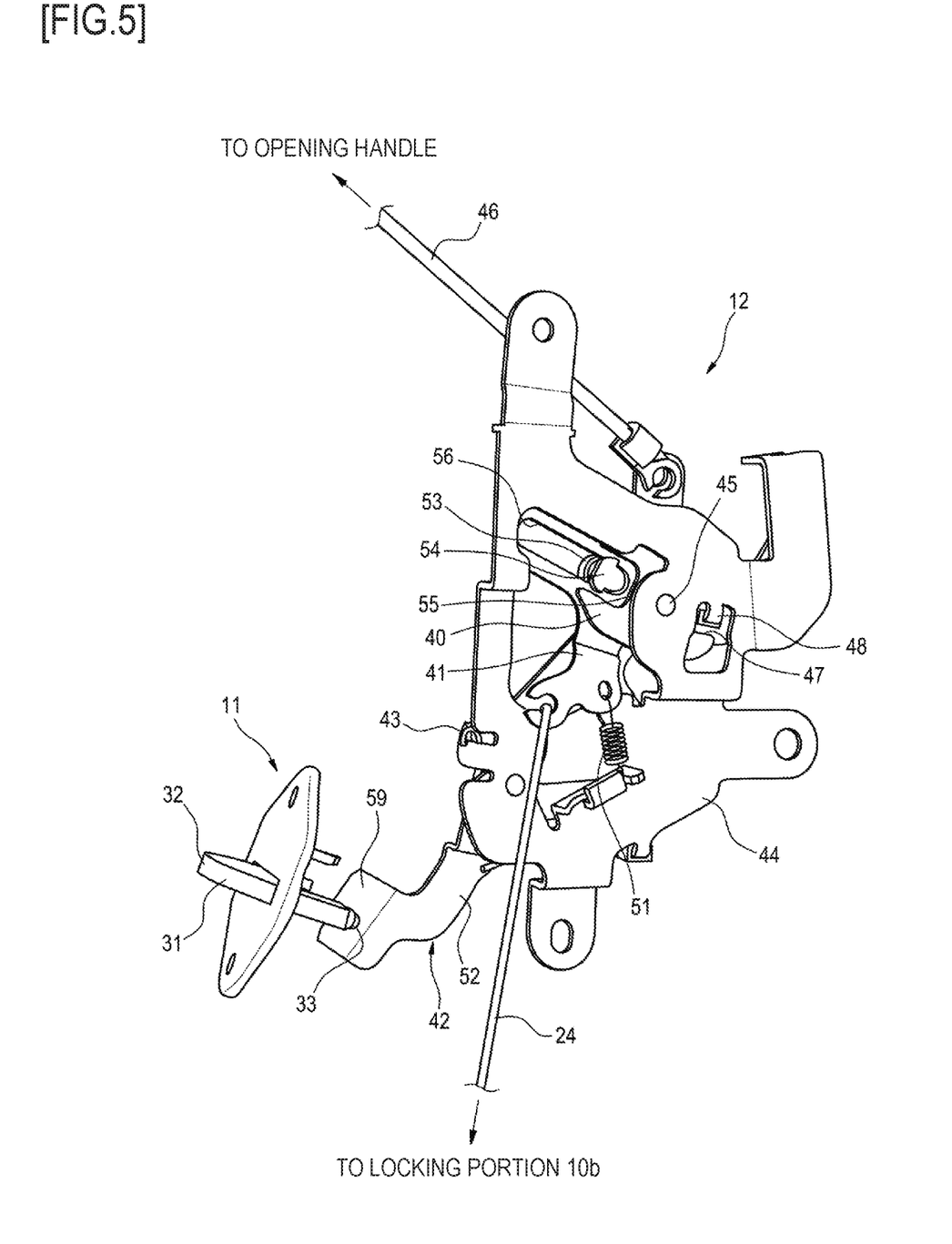
FIG. 5 A diagram showing the configuration of the relay portion shown in FIG. 4.
Figure 6:
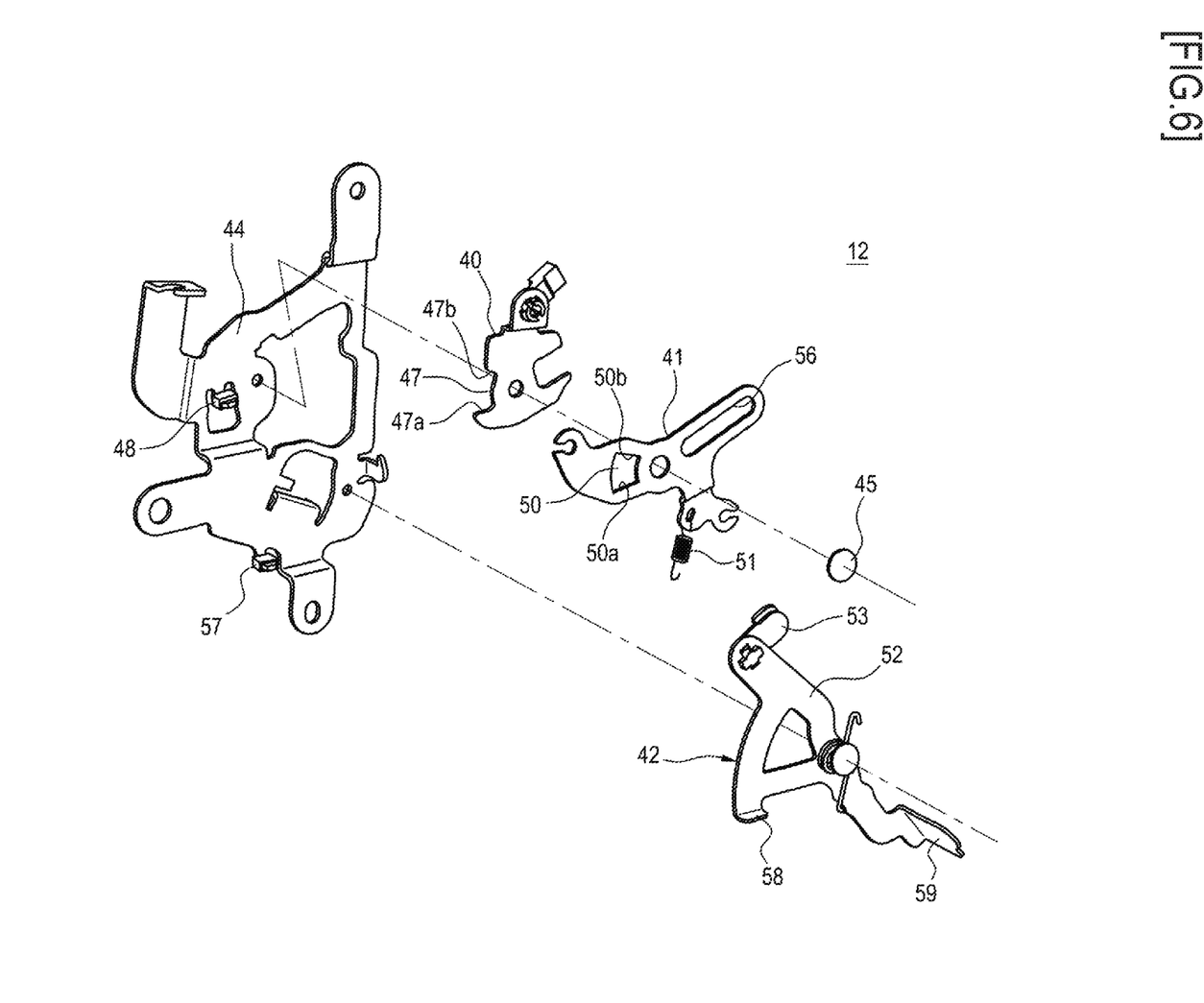
FIG. 6 An exploded view showing the configuration of the relay portion shown in FIG. 4.

FIGS. 4 to 6 show the configuration of the relay portion 12.

The relay portion 12 has a drive portion 40 that is linked with the operation of the opening handle, a driven portion 41 that transmits the action of the drive portion 40 to the locking portions 10a, 10b, a connecting portion 42 that connects the drive portion 40 and the driven portion 41 together, a spring (a first biasing member) 43 that biases the connecting portion 42, and a base plate 44 that is fixed to the structural member of the access panel door 3.

The drive portion 40 is configured as a lever which is supported on the base plate 44 so as to be swingable, and the driven portion 41 is also configured as a lever which is supported on the base plate 44 so as to be swingable. In the illustrated embodiment, the drive portion (hereinafter, referred to as a drive lever) 40 and the driven portion (hereinafter, referred to as a driven lever) 41 are disposed in an overlapping fashion and are supported by a common pivot shaft 45. The relay portion 12 can be reduced in size by disposing the drive lever 40 and the driven lever 41 coaxially.

The drive lever 40 is connected to the opening handle by way of a connection member 46 such as a rod or a cable. The connection member 46 is pushed or pulled in association with the operation of the opening handle, whereby the drive lever 40 is caused to swing between a first position which results when the opening handle is not operated and a second position which results when the opening handle is operated to open the access panel door 3.

A cutout 47 is provided in the drive lever 40 so as to extend into an arc-like shape about the pivot shaft 45, and a stopper 48 is provided on the base plate 44 so as to be brought into engagement with the cutout 47. The swinging of the drive lever 40 is restricted by the cutout 47 and the stopper 48. When the drive lever 40 staying in the first position, a circumferential end portion 47a of the cutout 47 is in abutment with the stopper 48, whereas when the drive lever 40 staying in the second position, the other circumferential end portion 47b of the cutout 47 is in abutment with the stopper 48.

The driven lever 41 is connected to the locking portions 10a, 10b by way of connection members 24.

An accommodation hole 50 is provided in the driven lever 41 so as to extend into an arc-like shape about the pivot shaft 45, and the stopper 48 of the base plate 44 is accommodated in this accommodation hole 50. The swinging of the driven lever 41 is restricted by the accommodation hole 50 and the stopper 48. The driven lever 41 can swing between a first position where a circumferential end portion 50a of the accommodation hole 50 is brought into abutment with the stopper 48 and a second position where the other circumferential end portion 50b of the accommodation hole 50 is brought into abutment with the stopper 48. The driven lever 41 is biased from the second position toward the first position by a spring 51 which is fixed to the base plate 44 at one end thereof.

The connecting portion 42 includes a connection lever 52 which is supported on the base plate 44 so as to be swingable and an arm 53 which is supported on the connection lever 52 so as to be swingable.

A connection pin 54, which is brought into engagement with the drive lever 40 and the driven lever 41, is provided at a swinging end of the arm 53. A hook 55 is provided on the drive lever 40, and this hook 55 extends radially from the pivot shaft 45 and is opened radially outwards. A guide hole 56 is provided in the driven lever 41, and this guide hole 56 also extends radially from the pivot shaft 45. With the drive lever 40 and the driven lever 41 disposed in the first positions, the hook 55 of the drive lever 40 and the guide hole 56 of the driven lever 41 are disposed so as to overlap each other.

The connection pin 54 is inserted through the guide hole 56 in the driven lever 41 to be brought into engagement with the driven lever 41. The connection pin 54 can move between a proximal end which lies to face the pivot shaft 45 and a distal end of the guide hole 56, which is accompanied by the rotation of the connection lever 52 and the rotation of the arm 53 relative to the connection lever 52. The connection lever 52 can swing between a connecting position where the connection pin 54 is disposed at the proximal end of the guide hole 56 and a disconnecting position where the connection pin 54 is disposed at the distal end of the guide hole 56.

Then, with the hook 55 on the drive lever 40 and the guide hole 56 in the driven lever 41 overlapping each other, the connection pin 54 is moved toward the proximal end side of the guide hole 56 and enters the hook 55 while being accompanied by the rotation of the connection lever 52 and the arm 53 to thereby be brought into engagement with the drive lever 40. As a result of the connection pin 54 entering the hook 55 to be brought into engagement with the drive lever 40, the drive lever 40 and the driven lever 41 are connected together by way of the connection pin 54.

The connection lever 52 is biased by the spring 43 from the disconnecting position where the connection pin 54 is disposed at the distal end of the guide hole 56 toward the connecting position where the connection pin 54 is disposed at the proximal end of the guide hole 56. A stopper 57 is provided on the base plate 44 to retain the connection lever 52 which is biased from the disconnecting position to the connecting position in the connecting position, and an abutment piece 58 is provided on the connection lever 52 so as to be brought into abutment with the stopper 57.

A receiving portion 59 is provided on the connection lever 52, and the acting portion 33 of the movable member 31 of the detecting portion 11 is brought into direct abutment with this receiving portion 59. When the main door 2 is closed, the movable member 31 rotates from the protruding position P1 to the pushed-in position P2, during which the movable member 31 pushes in the receiving portion 59 while causing the acting portion 33 to slide on the receiving portion 59. The connection lever 52 in which the receiving portion 59 is so pushed in is rotated toward the disconnecting position against the biasing by the spring 43.

Preferably, the acting portion 33 which slides on the receiving portion 59 is formed into a spherical shape. This reduces the sliding resistance, and additionally, the sliding resistance becomes stable without changing the contact portion of the acting portion 33 with the receiving portion 59, thereby making it possible to allow the movable member 31 to operate smoothly.

Figure 7:
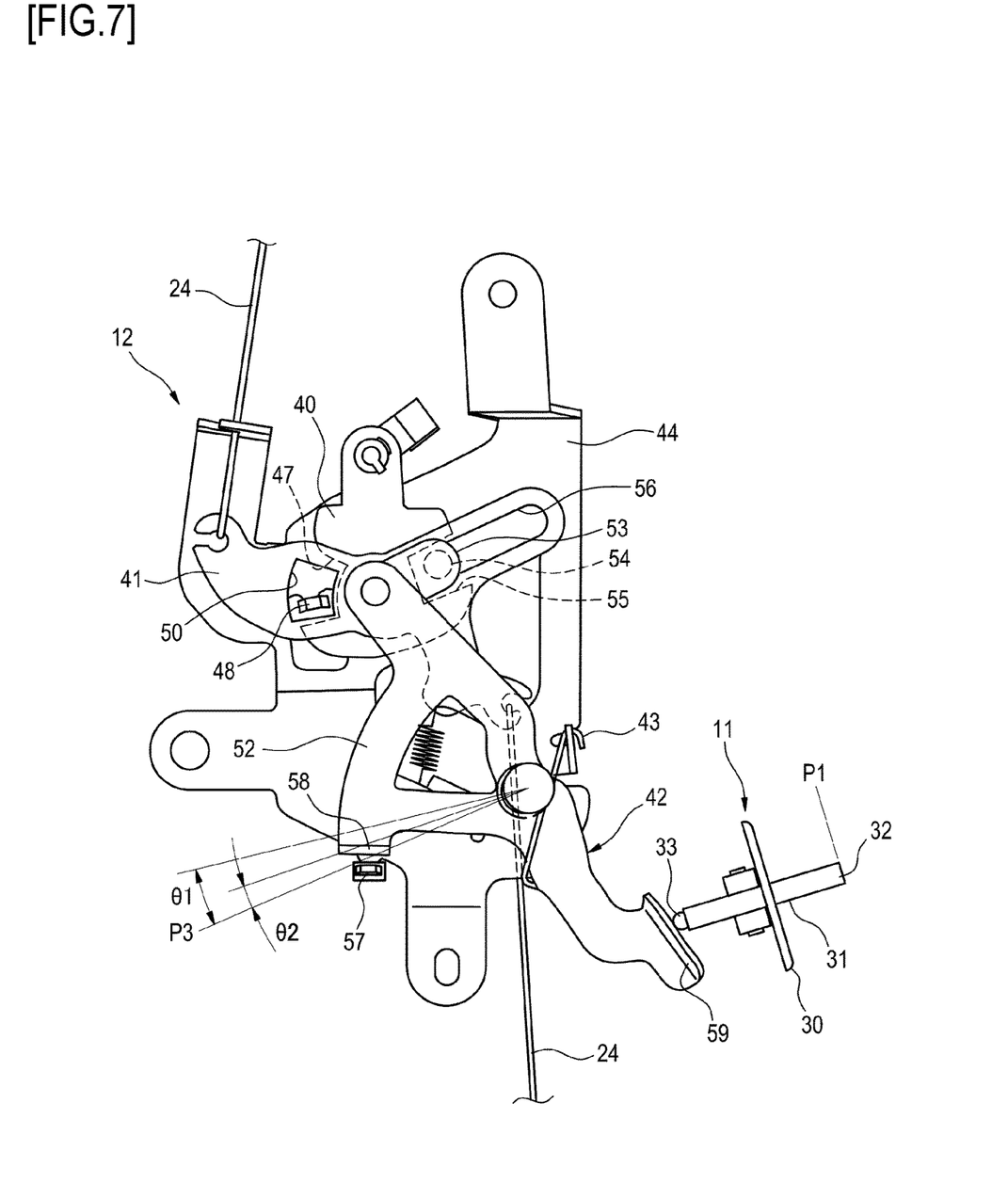
FIG. 7 A diagram showing the operation of the relay portion shown in FIG. 4.
Figure 8:
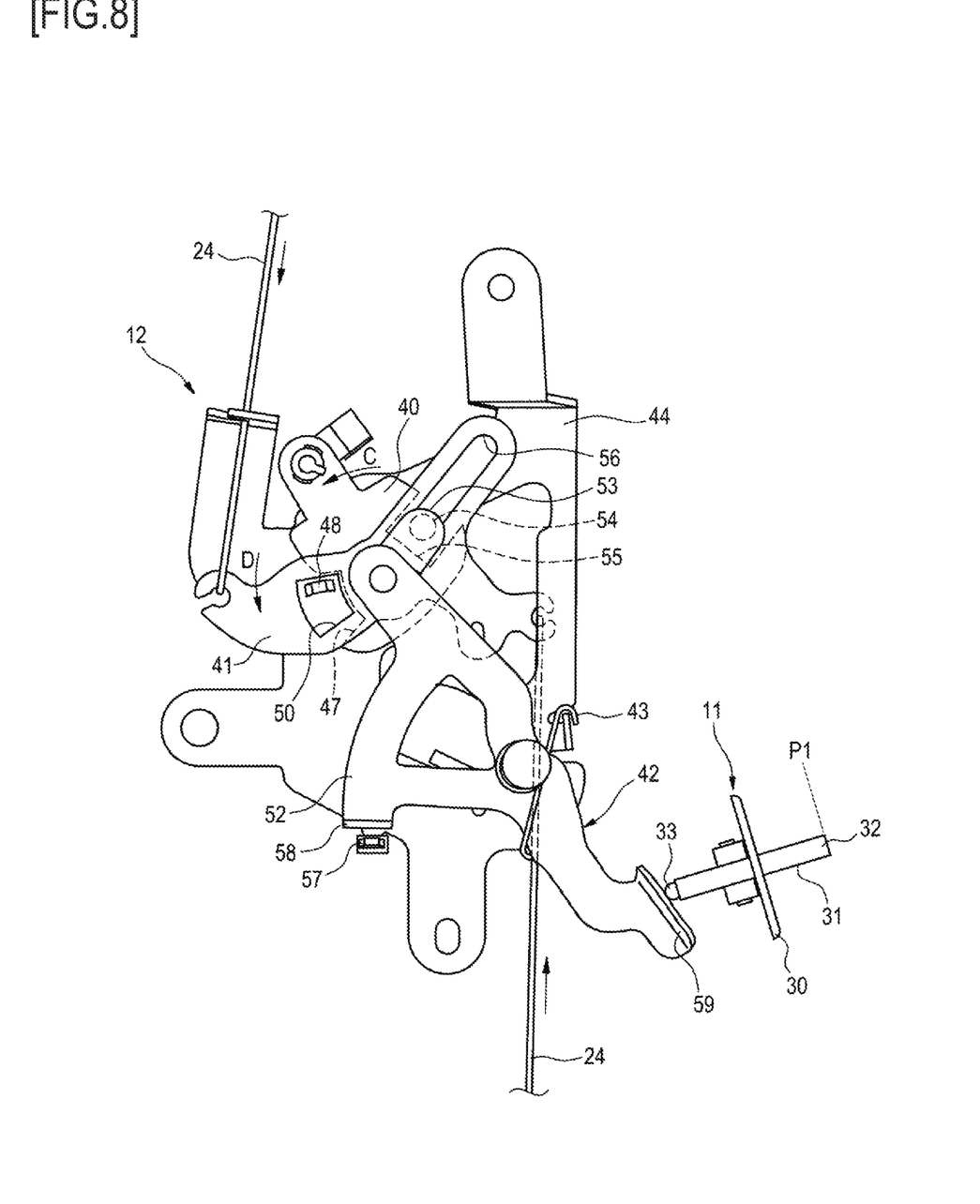
FIG. 8 A diagram showing the operation of the relay portion shown in FIG. 4.

FIGS. 7 and 8 show an operation of the relay portion 12 when the main door 2 is open.

In FIG. 7, the main door 2 is opened, and the movable member 31 of the detecting portion 11 is disposed in the protruding position P1. The drive lever 40 and the driven lever 41 are disposed in their first positions, and the hook 55 on the drive lever 40 and the guide hole 56 in the driven lever 41 overlap each other. Additionally, the abutment piece 58 is in abutment with the stopper 57 on the base plate 44, and the connection lever 52 is biased by the spring 43 toward the connecting position P3 where the connection pin 54 is disposed at the proximal end of the guide hole 56, whereby the connection pin 54 enters the hook 55 to be in engagement with the drive lever 40, and the drive lever 40 and the driven lever 41 are connected together via the connection pin 54.

When the opening handle is operated to open the access panel door 3, as shown in FIG. 8, the drive lever 40 is rotated in a direction indicated by an arrow C and is moved to the second position. Since the drive lever 40 and the driven lever 41 are connected together via the connection pin 54, the driven lever 41 is also rotated together with the drive lever 40 in the direction indicated by the arrow D and is moved to the second position. As the driven lever 41 rotates, the connection members 24 which connect individually the driven lever 41 with the locking portions 10a, 10b are pulled, whereby the locking of the access panel door 3 by the locking portions 10a, 10b is released, allowing the access panel door 3 to be opened.

Figure 9:
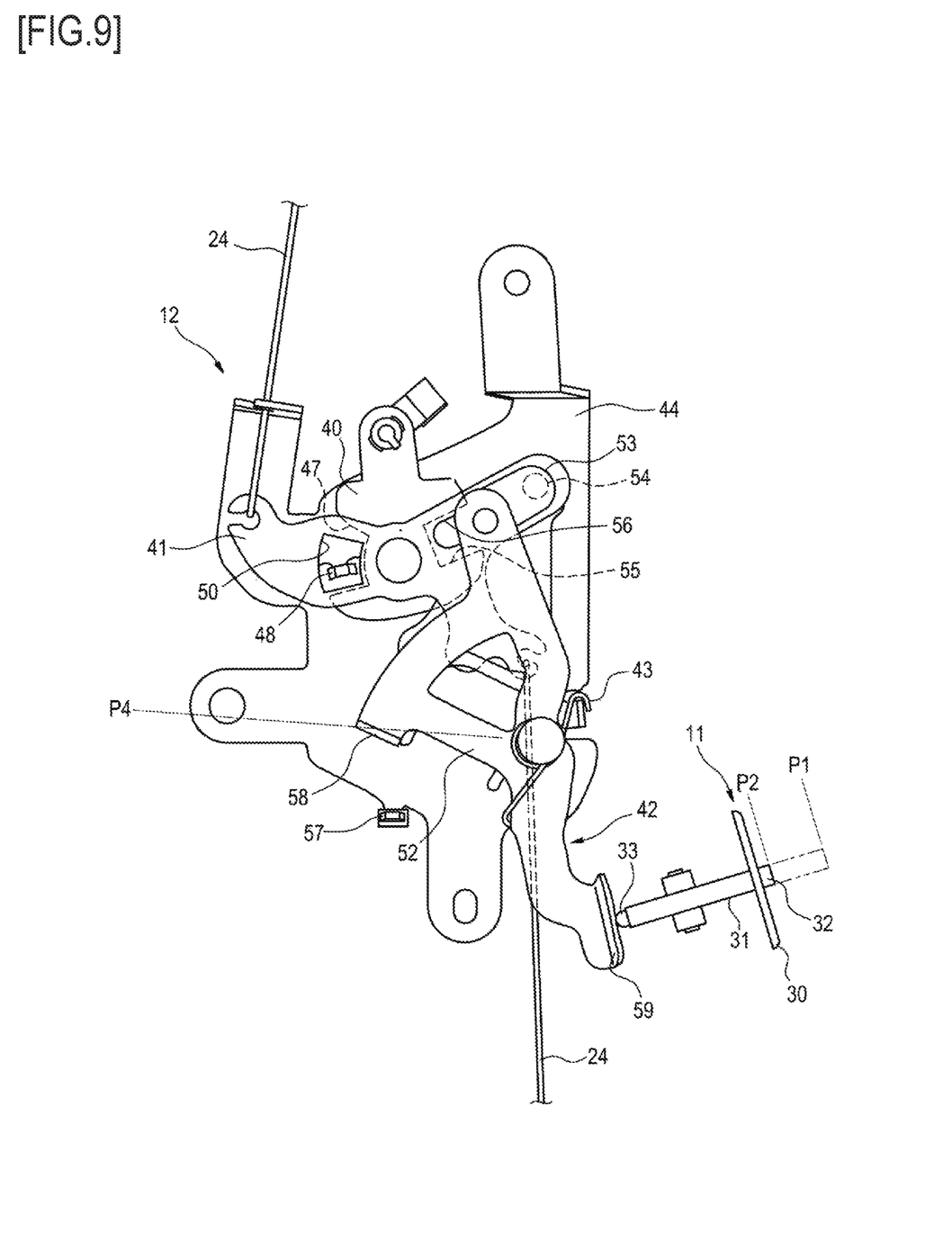
FIG. 9 A diagram showing the operation of the relay portion shown in FIG. 4.
Figure 10:
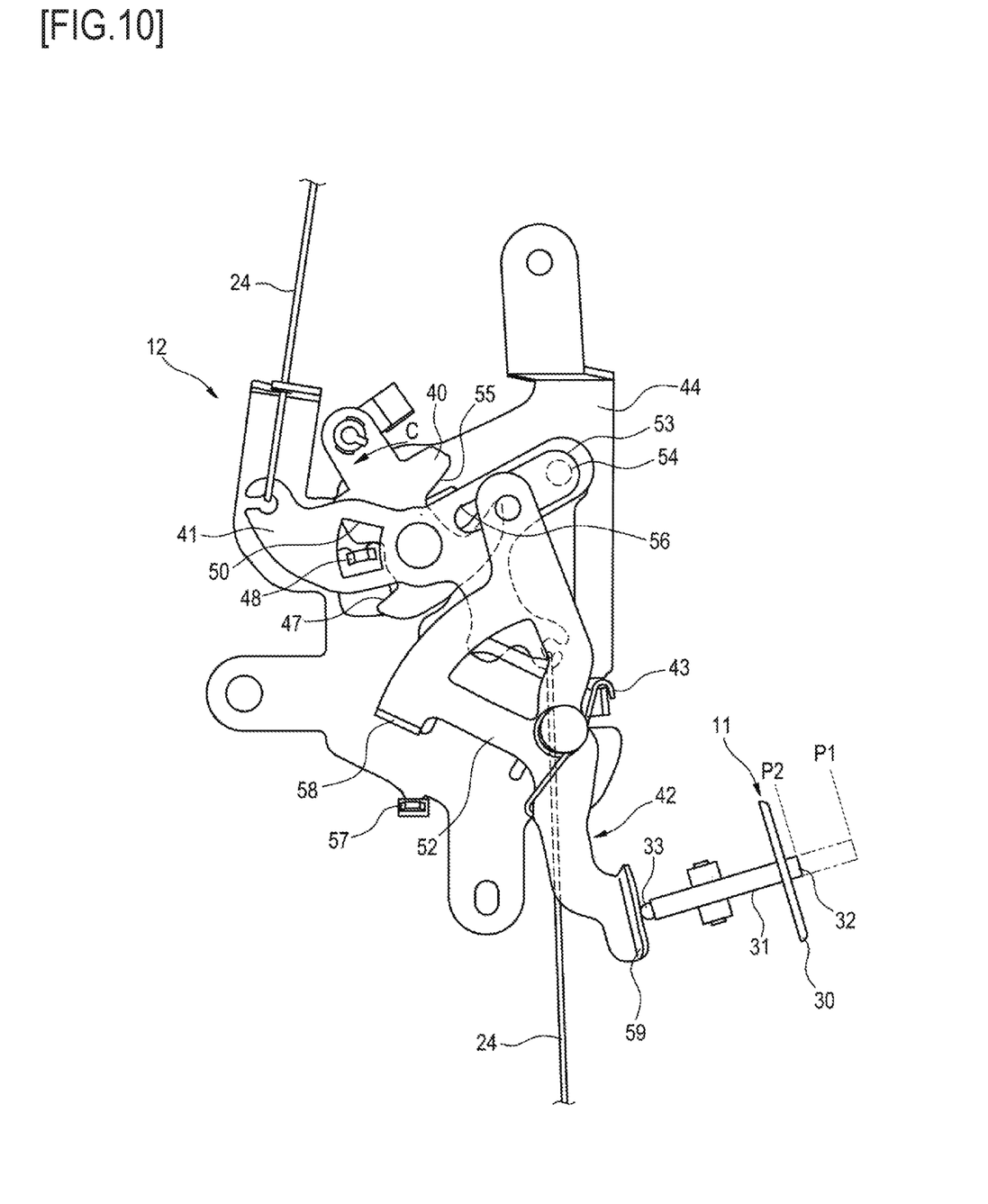
FIG. 10 A diagram showing the operation of the relay portion shown in FIG. 4.

FIGS. 9 and 10 show an operation of the relay portion 12 when the main door 2 is closed.

In FIG. 9, the main door 2 is closed, and the movable member 31 of the detecting portion 11 is disposed in the pushed-in position P2. The drive lever 40 and the driven lever 41 are disposed in their first positions, and the hook 55 on the drive lever 40 and the guide hole 56 in the driven lever 41 overlap each other. However, the connection lever 52 in which the receiving portion 59 is pushed in by the movable member 31 which is disposed in the pushed-in position P2 is moved to the disconnecting position P4 where the connection pin 54 is disposed at the distal end of the guide hole 56. Consequently, the connection pin 54 is dislocated from the hook 55 and is disengaged from the drive lever 40, and the drive lever 40 and the driven lever 41 are not connected together.

When the opening handle is operated to open the access panel door 3, as shown in FIG. 10, although the drive lever 40 is rotated in the direction indicated by the arrow C to be moved to the second position, the driven lever 41 which is not connected to the drive lever 40 is left in the first position, and the locking of the access panel door 3 by the locking portions 10a, 10b is maintained.

Here, referring to FIG. 7, the hook 55 on the drive lever 40 can be brought into engagement with the connection pin 54 which is moved within a predetermined lengthwise range toward the distal end of the guide hole 56 from the position of the connection pin 54 which is disposed at the proximal end of the guide hole 56 in the drive lever 41 as an originating point. Namely, the connection lever 52 can maintain the connection of the drive lever 40 with the driven lever 41 within a predetermined rotational area θ1 from the connecting position P3 where the connection pin 54 is disposed at the proximal end of the guide hole 56.

Then, with the movable member 31 of the detecting portion 11 disposed in the protruding position P1, the movable member 31 is in direct abutment with the receiving portion 59 of the connection lever 52 to push in the receiving portion 59. The connection lever 52 in which the receiving portion 59 is so pushed in is moved from the connecting position P3 by an angle θ2 toward the disconnecting position P4 against the biasing by the spring 43 within the range of the rotational area θ1 where the connection of the drive lever 40 with the driven lever 41 can be maintained.

According to the configuration which has been described heretofore, since the connection lever 52 which connects the drive lever 40 with the driven lever 41 in response to the opening of the main door 2 and the movable member 31 of the detecting portion 11 which is operated in association with the opening and closing of the main door 2 are brought into direct abutment, compared with a case where the connection lever 52 and the movable member 31 are connected together via a connection member, the number of constituent components can be reduced, and additionally, the necessity of considering the tolerance for the length of the connection member can be obviated. Further, the production cost of the opening control device 1 can be reduced.

In addition, even though a dimension error occurs in the structural member of the access panel door 3 to which the detecting portion 11 and the relay portion 12 are fixed, the contact between the connection lever 52 and the movable member 31 is maintained by means of the self-adjustment of the connection lever 52 which is biased by the spring 43, whereby the connection lever 52 and the movable member 31 are moved together at all times. This allows the connection lever 52 to switch the connecting state of the drive lever 40 with the driven lever 41 between a connected state and a disconnected state in an ensured fashion. Additionally, it is possible to prevent the collision of the movable member 31 with the connection lever 52 to thereby avoid the generation of a striking sound.

The movable member 31 of the detecting portion 11 which is disposed in the pushed-in position P2 is pushed back by the connection lever 52 which is biased by the spring (the first biasing member) 43 of the relay portion 12 to return to the protruding position P1 as the main door 2 is opened. However, in this opening control device 1, the spring (the second biasing member) 34 which biases the movable member 31 toward the protruding position P1 is provided on the detecting portion 11 separately (refer to FIG. 3). Consequently, the movable member 31 is biased by the spring 34 to return to the protruding position P1.

It is preferable that the biasing force of the spring 43 which biases the connection lever 52 is made greater than the biasing force of the spring 34 which biases the movable member 31 so that the rotation speed of the connection lever 52 based on the biasing by the spring 43 becomes equal to or greater than the rotation speed of the movable member 31 based on the biasing by the spring 34. This can maintain the contact between the connection lever 52 and the movable member 31.

Thus, while the invention has been described by reference to the specific embodiment, it is obvious to those skilled in the art to which the invention pertains that various alterations or modifications can be made thereto without departing from the spirit and scope thereof.

INDUSTRIAL APPLICABILITY

The invention can also be applied to a back door of a vehicle which is made up of double doors in addition to the side door.

REFERENCE SIGNS LIST 1 opening control device
2 main door (main opening-and-closing member)
3 access panel door (auxiliary opening-and-closing member)
10a locking portion
10b locking portion
11 detecting portion
12 relay portion
30 base plate (support member)
31 movable member
33 acting portion (abutment portion)
34 spring (second biasing member)
35 stopper
36 buffer material
40 drive lever
41 driven lever
42 connecting portion
43 spring (first biasing member)
52 connection lever
53 arm
54 connection pin
55 hook
56 guide hole
59 receiving portion (abutted portion)

The invention claimed is:

1. An opening control device, which is provided on an auxiliary opening-and-closing member that is opened in such a way as to follow an opening of a main opening-and-closing member, and which is configured to control the opening of the auxiliary opening-and-closing member, the opening control device comprising:
a locking portion configured to switch between a locking state, in which the auxiliary opening-and-closing member is locked in a closed state relative to a frame member, and an unlocking state;
a detecting portion, which is placed at an abutment portion of the auxiliary opening-and-closing member with the main opening-and-closing member, and which has a movable member that is moveable between a protruding position and a pushed-in position, the movable member being pushed into the pushed-in position from the protruding position by the main opening-and-closing member when the main opening-and-closing member is in a closed state and the auxiliary opening-and-closing member is in the closed state;
a drive portion that is linked with an opening operation of the auxiliary opening-and-closing member;
a driven portion, which is operated by movement of the drive portion, and which is configured to shift the locking portion from the locking state to the unlocking state;
a connecting portion that is moveable between a connecting position, in which the drive portion and the driven portion are connected together so that the movement of the drive portion is transmitted to the driven portion during the opening operation, and a disconnecting position; and
a first biasing member that biases the connecting portion from the disconnecting position toward the connecting position,
wherein the movable member is in direct abutment with the connecting portion to move the connecting portion from the connecting position to the disconnecting position when the movable member is moved from the protruding position to the pushed-in position,
wherein the connecting portion is movable within a displacement area, which includes the connecting position and a predetermined rotational area from the connecting position to the disconnecting position,
wherein, when the connecting portion is in the displacement area, the connecting portion maintains the connection of the drive portion with the driven portion,
wherein the connecting portion is movable within the displacement area toward the disconnecting position while the movable member is in the protruding position,
wherein the connecting portion is moved to the disconnecting position when the movable member is pushed into the pushed-in position,
wherein the movable member comprises a stopper that retains the movable member in the protruding position by being brought into abutment with a support member movably supporting the movable member,
wherein an outer circumference of the stopper is covered with a buffer material, and
wherein the detecting portion further comprises a second biasing member that biases the movable member from the pushed-in position toward the protruding position.

2. The opening control device according to claim 1, wherein a biasing force of the first biasing member is greater than a biasing force of the second biasing member.

3. The opening control device according to claim 1, wherein an abutment portion of the movable member, which is configured to be brought into direct abutment with the connecting portion, is formed into a spherical shape, and is slidable on an abutted portion provided on the connecting portion when in direct abutment with the connecting portion.

4. An open control device, which is provided on an auxiliary open-and-close member that is opened in such a way as to follow an opening of a main open-and-close member, and which is configured to control the opening of the auxiliary open-and-close member, the open control device comprising:
   a lock portion configured to switch between a lock state, in which the auxiliary open-and-close member is locked in a closed state relative to a frame member, and an unlock state;
   a detection portion, which is placed at an abutment portion of the auxiliary open-and-close member with the main open-and-close member, and which has a movable member that is moveable between a protrusion position and a pushed-in position, the movable member being pushed into the pushed-in position from the protrusion position by the main open-and-close member when the main open-and-close member is in a closed state and the auxiliary open-and-close member is in the closed state;
   a drive portion that is linked with an opening operation of the auxiliary open-and-close member;
   a driven portion, which is operated by movement of the drive portion, and which is configured to shift the lock portion from the lock state to the unlock state;
   a connection portion that is moveable between a connection position, in which the drive portion and the driven portion are connected together so that the movement of the drive portion is transmitted to the driven portion during the opening operation, and a disconnection position; and
   a first bias member configured to bias the connection portion from the disconnection position toward the connection position,
   wherein the movable member is in direct abutment with the connection portion to move the connection portion from the connection position to the disconnection position when the movable member is moved from the protrusion position to the pushed-in position,
   wherein the connection portion is movable within a displacement area, which includes the connection position and a predetermined rotational area from the connection position to the disconnection position,
   wherein, when the connection portion is in the displacement area, the connection portion maintains the connection of the drive portion with the driven portion,
   wherein the connection portion is movable within the displacement area toward the disconnection position while the movable member is in the protrusion position,
   wherein the connection portion is moved to the disconnection position when the movable member is pushed into the pushed-in position, and
   wherein the detection portion further comprises a second bias member configured to bias the movable member from the pushed-in position toward the protrusion position.

5. The open control device according to claim 4, wherein the movable member comprises a stopper configured to retain the movable member in the protrusion position by being brought into abutment with a support member configured to movably support the movable member.

6. The open control device according to claim 5, wherein an outer circumference of the stopper is covered with a buffer material.

\* \* \* \* \*